(12) United States Patent
Mehta

(10) Patent No.: US 11,782,986 B2
(45) Date of Patent: Oct. 10, 2023

(54) INTERACTIVE QUERY BASED NETWORK COMMUNICATION THROUGH A MEDIA DEVICE

(71) Applicant: Trushant Mehta, Sterling, VA (US)

(72) Inventor: Trushant Mehta, Washington, DC (US)

( * ) Notice: Subject to any disclaimer, the term of this patent is extended or adjusted under 35 U.S.C. 154(b) by 0 days.

(21) Appl. No.: 16/832,006

(22) Filed: Mar. 27, 2020

(65) Prior Publication Data

US 2021/0303637 A1    Sep. 30, 2021

(51) Int. Cl.
*G06F 16/903*  (2019.01)
*G06F 16/9038*  (2019.01)
*G06N 20/00*  (2019.01)
*G06F 16/901*  (2019.01)

(52) U.S. Cl.
CPC ...... *G06F 16/90335* (2019.01); *G06F 16/901* (2019.01); *G06F 16/9038* (2019.01); *G06N 20/00* (2019.01)

(58) Field of Classification Search
CPC ........... G06F 16/90335; G06F 16/9038; G06F 16/901; G06N 20/00
See application file for complete search history.

(56) References Cited

U.S. PATENT DOCUMENTS

| | | | |
|---|---|---|---|
| 8,963,836 B2 | 2/2015 | Cheng et al. | |
| 9,098,467 B1 | 8/2015 | Blanksteen et al. | |
| 9,781,262 B2 | 10/2017 | Hardy et al. | |
| 9,959,129 B2 | 5/2018 | Kannan et al. | |
| 10,149,102 B2 | 12/2018 | Reddy et al. | |
| 10,503,468 B2 | 12/2019 | Thangarathnam et al. | |
| 2009/0157483 A1 | 6/2009 | Otto et al. | |
| 2009/0307159 A1* | 12/2009 | Pinckney | G06Q 30/0601 706/11 |
| 2012/0221502 A1 | 8/2012 | Jerram et al. | |
| 2013/0132167 A1* | 5/2013 | Krug | G07B 15/02 705/13 |
| 2013/0159939 A1 | 6/2013 | Krishnamurthi | |
| 2019/0043610 A1 | 2/2019 | Vaughan | |
| 2019/0066136 A1 | 2/2019 | Kopikare | |
| 2019/0114321 A1* | 4/2019 | Lam | G06Q 10/1053 |
| 2019/0179607 A1 | 6/2019 | Thangarathnam et al. | |

OTHER PUBLICATIONS

International Search Report and Written Opinion dated Jun. 8, 2021 for PCT Application No. PCT/US2021/23618, 10 pages.

* cited by examiner

*Primary Examiner* — Irete F Ehichioya
*Assistant Examiner* — Xiaoqin Hu
(74) *Attorney, Agent, or Firm* — Dave Law Group LLC; Raj S. Dave

(57) ABSTRACT

A method includes, through a server, determining a context of interaction between a user of a data processing device communicatively coupled to the server through a computer network and the server, fetching a set of queries from a database associated with the server in accordance with determining the context of interaction, and loading the set of queries one by one on a first media device configured to render the set of queries in an audio, a video and/or a gesture format. The method also includes, through the server, receiving a response to a query of the set of queries from the user via the first media device and/or the data processing device, and refining the set of queries based on the response received to the query from the user in accordance with an Artificial Intelligence (AI) and/or a Machine Learning (ML) engine executing on the server.

19 Claims, 10 Drawing Sheets

Survey 300

Portion 302
1. On a scale of 1 to 5, how would you rate your experience with _____ hospital?
2. Would you recommend _____ hospital for the quality of care provided to you?
3. On a scale of 1 to 10, how helpful were the doctors and the staff?
4. Would you recommend the food facility at the hospital?

Portion 304
5. How smooth was the bill settling process at the hospital?
6. How clean was the hospital on a scale of 1 to 10?
7. How did you find the parking facilities at the hospital?
8. Do you have any suggestions?

Fig. 3

INTERACTIVE QUERY BASED NETWORK COMMUNICATION THROUGH A MEDIA DEVICE

FIELD OF THE INVENTION

This disclosure relates generally to network communication and, more particularly, to an interactive query based network communication through a media device.

BACKGROUND

An interactive query based network communication may involve a survey in which questions are presented to a user to fill and submit through an interface provided therefor via a data processing device (e.g., through an interface on an application executing on the data processing device). The responses of the user may serve as a product feedback to a creator of the survey. However, the questions on the survey may be preset, thereby rendering the survey non-adaptive. Moreover, the user may have to respond to the survey in inflexible settings having rigid constraints (e.g., user requirement of carrying a laptop or sitting at a desktop computer).

In another example scenario, the interactive query based network communication may involve skill-based testing through a computing device. Because of the inflexibility of the settings, the aforementioned communication may be disadvantageous to a visually impaired aspirant.

SUMMARY OF INVENTION

Disclosed are a method, a server and/or a system of an interactive query based network communication through a media device.

An embodiment relates to a method including determining, through a server, a context of interaction between a user of a data processing device communicatively coupled to the server through a computer network and the server, and fetching, through the server, a set of queries from a database associated with the server in accordance with determining the context of interaction. The method also includes loading, through the server, the set of queries one by one on a first media device configured to render the set of queries in an audio, a video and/or a gesture format, and receiving, through the server, a response to a query of the set of queries from the user via the first media device and/or the data processing device. The first media device is also communicatively coupled to the server through the computer network. Further, the method includes refining, through the server, the set of queries based on the response received to the query of the set of queries from the user in accordance with an Artificial Intelligence (AI) and/or a Machine Learning (ML) engine executing on the server.

Another embodiment relates to a server including a memory and a processor communicatively coupled to the memory. The processor is configured to execute instructions to determine a context of interaction between a user of a data processing device communicatively coupled to the server through a computer network and the server, fetch a set of queries from a database associated with the server in accordance with determining the context of interaction, and load the set of queries one by one on a first media device configured to render the set of queries in an audio, a video and/or a gesture format. The first media device is also communicatively coupled to the server through the computer network. The processor is also configured to execute instructions to receive a response to a query of the set of queries from the user via the first media device and/or the data processing device, and refine the set of queries based on the response received to the query of the set of queries from the user in accordance with an AI and/or an ML engine executing on the server.

Yet another embodiment relates to a system including a server, a computer network, a data processing device communicatively coupled to the server through the computer network, and a first media device also communicatively coupled to the server through the computer network. The server is configured to determine a context of interaction between a user of the data processing device and the server, fetch a set of queries from a database associated with the server in accordance with determining the context of interaction, and load the set of queries one by one on the first media device configured to render the set of queries in an audio, a video and/or a gesture format. The server is also configured to receive a response to a query of the set of queries from the user via the first media device and/or the data processing device, and refine the set of queries based on the response received to the query of the set of queries from the user in accordance with an AI and/or an ML engine executing on the server.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 3 is an illustrative view of a survey in the example context of FIG. 2.

Figure 1:
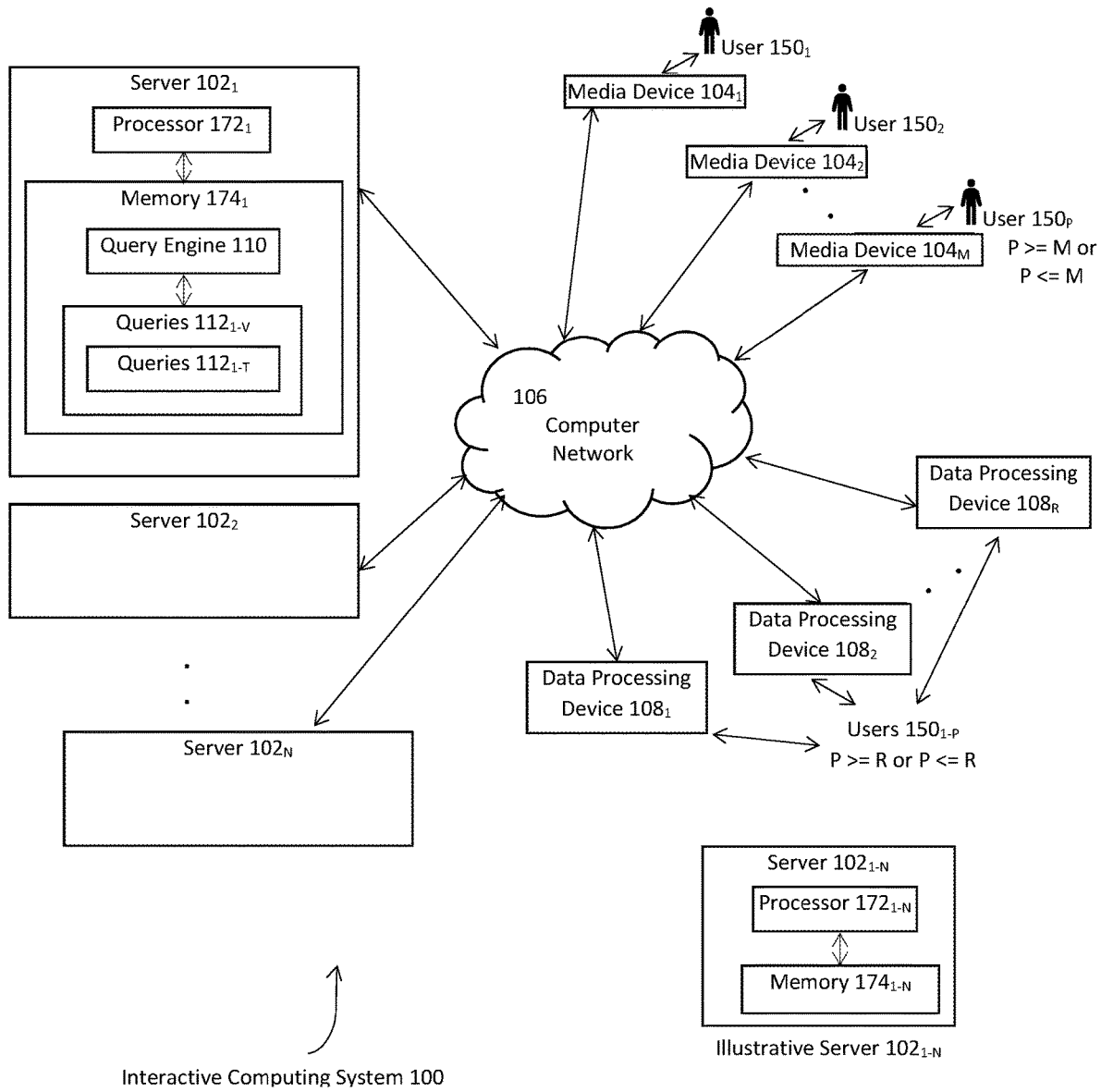
FIG. 1 is a schematic view of an interactive computing system, according to one or more embodiments.

Other features of the present embodiments will be apparent from the accompanying drawings and from the detailed description that follows.

DETAILED DESCRIPTION

The articles "a" and "an" are used herein refers to one or to more than one (i.e., to at least one) of the grammatical object of the article. By way of example, "an element" means one element or more than one element.

The term "comprising", which is synonymous with "including", "containing", or "characterized by" here is defined as being inclusive or open-ended, and does not exclude additional, unrecited elements or method steps, unless the context clearly requires otherwise.

In order to fully understand the scope of the invention, the following terms used herein are hereby defined.

The term, query is defined as a request for information.

The term, computer network is defined as a plurality of computers that are interconnected so they can exchange information.

The term, media is defined as forms of electronically transmitted information, such as audio, video, graphics, and/or text.

The term, device is defined as an electronic element that cannot be divided without destroying its stated function.

The term, user includes a person or a computer.

The term, data processing is defined as the manipulation of data which performs some operation or sequence of operations on the data.

The term, server is defined as a computer that manages network resources.

The term, context is defined as surrounding circumstances, which could include surrounding speech or text.

The term, communicatively coupled is defined as devices connected in a way that permits communication.

The term, set is defined as a collection or group.

The term, database is defined as a comprehensive collection of related data organized for convenient access.

The term, loading is defined as copying into memory.

The term configured is defined as arranged within the system to perform certain functions.

The term, render is defined as generating audio, video, graphics, and/or text from media data.

The term, gesture is defined as a form of non-verbal communication or non-vocal communication in which bodily actions communicate particular messages, either in place of, or in conjunction with, speech.

The term, format is defined as a layout for encoding data for storage or execution in a computer.

The term, receiving is defined as being given information.

The term, response is defined as something constituting a reply or a reaction.

The term, based on is defined as dependent on.

The term, a plurality of is defined as multiple.

The term, authenticate is defined as to determine that something is, in fact, what it purports to be.

The term, memory is defined as any device in which information can be stored.

The term, execute is defined as run or launch.

The term, instructions is defined as software program or machine executable code.

The term, identifier is defined as a string of characters, sequence of bits or other data that establishes identity.

The term, trigger is defined as an event, message, or message sequence sufficient to initiate, cause, or task an action.

The term, notification is defined as some form of visual, auditory, or physical cue to draw attention to an incoming message.

Implementations and all of the functional operations described in this specification may be realized in digital electronic circuitry, or in computer software, firmware, or hardware.

A software program (also known as a program, software, executable code or instructions) may be written in any appropriate form of programming language, including compiled or interpreted languages, and it may be deployed in any appropriate form, including as a stand alone program or as a module, component, subroutine, or other unit suitable for use in a computing environment.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Even though particular combinations of features are recited in the claims and/or disclosed in the specification, these combinations are not intended to limit the disclosure of possible implementations. Other implementations are within the scope of the claims.

Example embodiments, as described below, may be used to provide interactive query based network communication through a media device. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

FIG. 1 shows an interactive computing system 100, according to one or more embodiments. In one or more embodiments, interactive computing system 100 may include a number of servers 102$_{1-N}$ communicatively coupled to a number of media devices 104$_{1-M}$. Examples of media devices 104$_{1-M}$ may include but are not limited to audio devices, video devices, gesture recognition devices and touch based devices. In one example embodiment, the aforementioned media devices 104$_{1-M}$ may be Internet of Things (IoT) devices; media devices 104$_{1-M}$ may also be data processing devices (e.g., an Apple mobile phone including APPLE, Inc.'s SIRI®, a brain imaging/neuro-imaging device) interpretable as audio devices, video devices, gesture recognition devices and touch based devices. In one or more embodiments, servers 102$_{1-N}$ may be communicatively coupled to media devices 104$_{1-M}$ through a computer network 106, examples of which include but are not limited to a Wide Area Network (WAN), a Local Area Network (LAN), a hybrid network and a short range network (e.g., BLUETOOTH®, WI-FI®). Additionally, in one or more embodiments, servers 102$_{1-N}$ may be communicatively coupled to a number of data processing devices 108$_{1-R}$ (e.g., laptops, desktop computers, notebook computers, smart devices, mobile phones, IoT devices) through computer network 106.

In one or more embodiments, a server 102$_{1-N}$ (e.g., server 102$_1$ in FIG. 1) may execute a query engine 110 configured to include instructions not limited in pertinence to generating a set of queries, refining said set of queries dynamically based on responses thereto, and improving the set of queries based on contextual matching across stored queries (e.g., queries 112$_{1-V}$ stored in a memory 174$_1$ of server 102$_1$; FIG.

1 shows each server $102_{1-N}$ as including a processor $172_{1-N}$ communicatively coupled to a memory $174_{1-N}$ (e.g., a volatile memory and/or a non-volatile memory); FIG. 1 shows query engine 110 and queries $112_{1-V}$ stored in memory $174_1$) therein. While FIG. 1 shows query engine 110 executing on server $102_1$, query engine 110 may also be distributed across servers $102_{1-N}$.

In one or more embodiments, users $150_{1-P}$ at media devices $104_{1-M}$ may respond to queries $112_{1-V}$ initiated through servers $102_{1-N}$. In one or more embodiments, queries $112_{1-T}$ (subset of queries $112_{1-V}$) may be sent to users $150_{1-P}$ at media devices $104_{1-M}$ based on context awareness (to be discussed below) thereof. In other words, in one or more embodiments, one or more queries $112_{1-T}$ may be sent to a media device $104_{1-M}$ based on determining a context of a user $150_{1-P}$ associated therewith. It should be noted that media devices $104_{1-M}$ may include but are not limited to AMAZON ECHO® smart speakers based on AMAZON ALEXA®, GOOGLE HOME MINI® devices, Apple devices based on APPLE, Inc.'s SIRI®, GOOGLE ASSISTANT® enabled smart devices, FACEBOOK®'s Portal devices, MICROSOFT's CORTANA® devices, MICROSOFT HOLOLENS® based devices and other forms of media devices.

Figure 2:
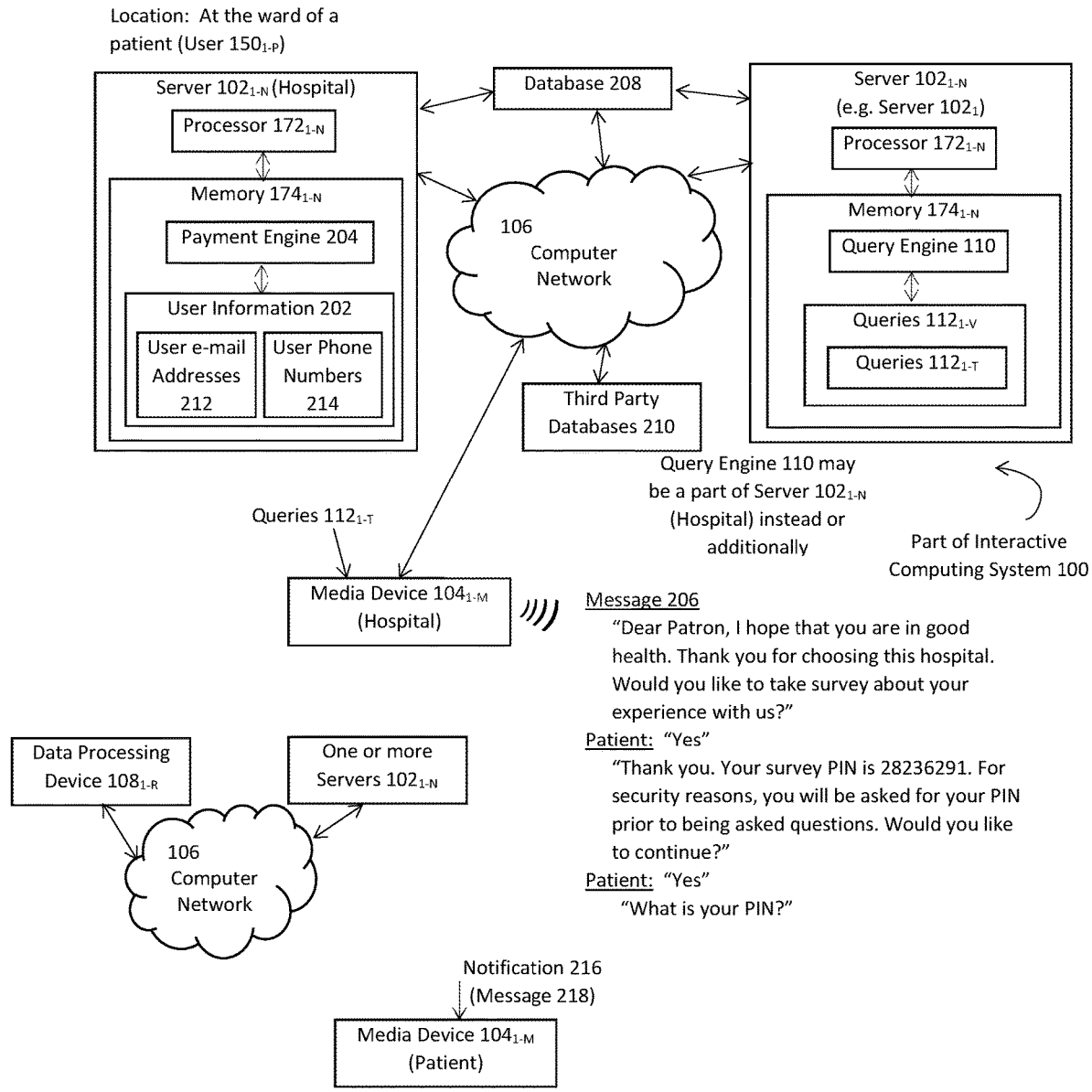
FIG. 2 is a schematic view of an example context in which the interactive computing system of FIG. 1 operates.

In one or more embodiments, one or more server(s) $102_{1-N}$ may be configured to execute Artificial Intelligence (AI)/Machine Learning (ML) engines to extract queries $112_{1-T}$, refine queries $112_{1-T}$ and build queries $112_{1-T}$ in specific contexts. FIG. 2 shows an example context in which interactive computing system 100 operates. Here, a hospital may be associated with a server $102_{1-N}$ that includes user information 202 stored therein. FIG. 2 shows user information 202 stored in memory $174_{1-N}$ of server $102_{1-N}$. In one or more embodiments, user information 202 may include an identifier (e.g., an e-mail address, a phone number) of a user $150_{1-P}$ of a media device $104_{1-M}$ communicatively coupled to server $102_{1-N}$, and identifiers of former and potential users $150_{1-P}$ thereof. An associate of user $150_{1-P}$ may settle the bills associated with the hospitalization of user $150_{1-P}$ at the hospital. The bill settlement process may also be enabled through an engine of server $102_{1-N}$. FIG. 2 shows payment engine 204 associated with the bill settlement process executing on server $102_{1-N}$; payment engine 204 is shown as being stored in memory $174_{1-N}$ configured to be executable through processor $172_{1-N}$.

The payment settlement process on the day of discharge of user $150_{1-P}$ (an example patient) may cause payment engine 204 to communicate with query engine 110 to trigger a message 206 (e.g., pertaining to loading of a set of queries $112_{1-T}$) through media device $104_{1-M}$. For example, media device $104_{1-M}$ may be an AMAZON ECHO® smart speaker owned by the hospital and installed thereby. Said media device $104_{1-M}$ may be in the ward of the patient. The payment settlement process may be at a time of the patient still being in the ward thereof waiting to be taken home. Now, the abovementioned triggering of message 206 may cause message 206 to be played through media device $104_{1-M}$ in the ward.

An example message 206 would be: "Dear patron, I hope that you are in good health. Thank you for choosing this hospital. Would you like to take a survey about your experience with us?" Message 206 may be a voice message. If the patron patient responds with a "yes," one or more servers $102_{1-N}$ (may include server $102_{1-N}$ associated with the hospital) may load another message along the lines of "Thank you. Your survey Personal Identification Number (PIN) is 28236291. For security reasons, you will be asked for your PIN prior to being asked questions. Would you like to continue?" (note that 28236291 is just an example PIN). If the patient responds with another "yes," he/she may be audibly prompted for the PIN. Upon the patient reciting the PIN, the one or more servers $102_{1-N}$ may load queries $112_{1-T}$ on media device $104_{1-M}$. For the aforementioned purpose, in one or more embodiments, the one or more servers $102_{1-N}$ may leverage an in-built database 208 communicatively coupled to server $102_{1-N}$ associated with the hospital.

FIG. 2 also shows third-party databases 210 communicatively coupled to servers $102_{1-N}$ through computer network 106, according to one or more embodiments. It should be noted that third-party databases 210 may also be associated with the one or more servers $102_{1-N}$ distributed across interactive computing system 100. Once the patient (example user $150_{1-P}$) is authenticated based on the abovementioned PIN, the one or more servers $102_{1-N}$ may fetch queries $112_{1-T}$ from third party databases 210 (e.g., product servers such as those associated with WALMART® and SURVEYMONKEY®) to load said queries $112_{1-T}$ on media device $104_{1-M}$. In another implementation, the patient may receive a communication from the one or more servers $102_{1-N}$ through a data processing device $108_{1-R}$ (e.g., a mobile phone having an e-mail client), wherein the abovementioned PIN is received. In this case, the patient may be made aware of the request for a survey thereto. Now, message 206 may be of the form "Dear patron, I hope that you are in good health. Thank you for choosing this hospital. As a valued guest, we really appreciate your feedback. We had sent in an e-mail inviting you to take our survey with your PIN details. Would you now like to take a survey about your experience with us?" When the patient responds with a "yes," the one or more servers $102_{1-N}$ may audibly prompt the patient for his/her PIN through media device $104_{1-M}$.

Once the authentication is done, the one or more servers $102_{1-N}$ may load queries $112_{1-T}$ as part of the survey on media device $104_{1-M}$. If the authentication fails, the patient may be prompted yet again with a message analogous to "The PIN that you have provided is invalid. Please provide your PIN once again." Depending on the implementation, access to the survey (and/or media device $104_{1-M}$) may be terminated based on a predetermined number of wrong PINS provided. It should also be noted that the same survey may be taken by other users $150_{1-P}$ associated with the patient. For example, patient may be user $150_1$ and the patient's brother may be user $150_2$. More than one user $150_{1-P}$ may be associated with a media device $104_{1-M}$ and the number of media devices $104_{1-M}$ in FIG. 1 need not be equal to the number of users $150_{1-P}$. Additionally, the number of data processing devices $108_{1-R}$ in FIG. 1 may be different from the number of media devices $104_{1-M}$ and/or the number of users $150_{1-P}$.

In the case of users $150_{1-P}$ other than the patient taking the survey, the PIN may be the same as that of the patient. Additionally, in some implementations, queries $112_{1-T}$ may include some portions thereof relevant to the patient and some portions relevant to users $150_{1-P}$ associated with the patient. FIG. 3 shows an example survey 300 including a portion 302 relevant to the patient and a portion 304 relevant to user(s) $150_{1-P}$ associated with the patient. Referring back to FIG. 3, the patient may not be in a position or may not feel up to it to finish answering survey 300. The patient may stop answering survey 300 and go home. Now, in one or more embodiments, the one or more servers $102_{1-N}$ may determine the association of the e-mail address of the patient in database 208 and perform matching thereof across other databases (e.g., including third-party databases 210) of interactive computing system 100 to figure out that the patient has a media device 104$_{1-M}$ similar to media device 104$_{1-M}$ at the hospital.

FIG. 2 shows user information 202 as including user e-mail addresses 212 and user phone numbers 214. In one example scenario, the hospital may be using an AMAZON ECHO® smart speaker as media device 104$_{1-M}$. The one or more servers 102$_{1-N}$ may figure out that the patient also is associated with an AMAZON ECHO® smart speaker based on matching user e-mail address 212 in database 208 (or, a third-party database 210). The survey services provided by the hospital may be based on Amazon Web Services (AWS) (AMAZON AWS®). Here, Application Programming Interfaces (APIs) exposed through AWS may enable the aforementioned matching to find the association of the patient with an AMAZON ECHO® smart speaker.

Once the aforementioned association is determined, a notification 216 may be rendered on the media device 104$_{1-M}$ associated with the patient. After going home, the patient may find out that the associated media device 104$_{1-M}$ (AMAZON ECHO® smart speaker) is indicating the presence of notification 216. The patient may check notification 216 to hear message 218 associated therewith. Message 218 (e.g., voice message) may be along the lines of "Dear patron, You have one survey pending for completion. You can provide your PIN to continue with the survey. Would you like to continue with the survey?" Once the patient says "yes" (e.g., voice response), he/she may be prompted for the PIN. Upon being authenticated, the survey may be continued from a point of previous discontinuity thereof. Again, it should be noted that associated users 150$_{1-P}$ of the patient may also complete the survey.

When the media device 104$_{1-M}$ of the patient is switched off at home, the patient may be made aware of notification 216 once the device is switched on. In some implementations, data processing device 108$_{1-R}$ may have an application associated with the media device 104$_{1-M}$ of the patient executing thereon. Said application may leverage location information of media device 104$_{1-M}$ to determine that the patient has reached home. Once the determination that the patient has reached home is done, the application, in conjunction with the one or more other servers 102$_{1-N}$ discussed above, may trigger the indication of notification 216 through the media device 104$_{1-M}$ of the patient. It should be noted that the authentication process discussed above is merely an example. Other forms of authentication are within the scope of the exemplary embodiments discussed herein.

Figure 4:
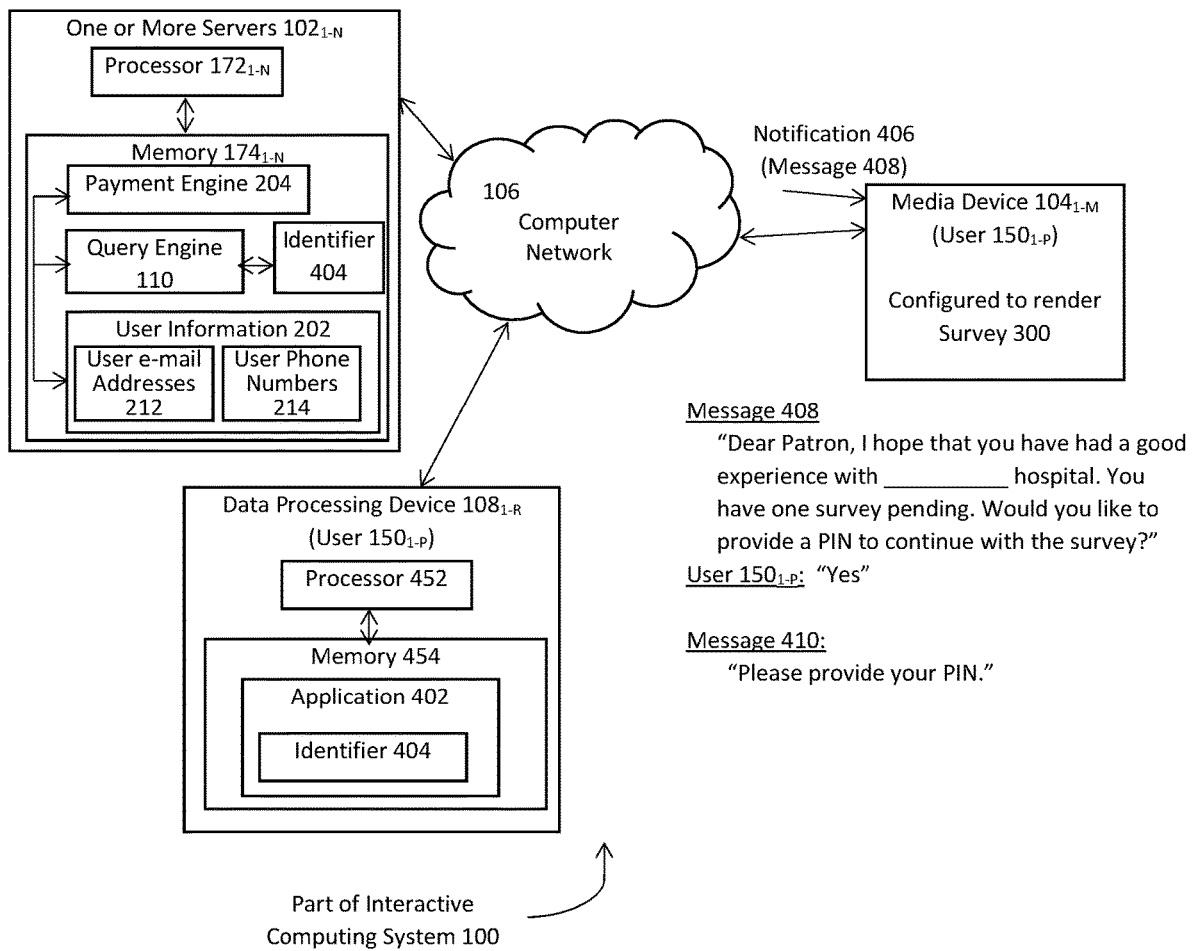
FIG. 4 is an illustrative view a scenario of initiation of the survey of FIG. 3 through a media device of a user in the interactive computing system of FIG. 1.

FIG. 4 illustrates a scenario of initiation of survey 300 through a media device 104$_{1-M}$ of user 150$_{1-P}$ (e.g., the patient of FIG. 2). Here, the hospital may not initiate survey 300 through media device 104$_{1-M}$ associated therewith. In fact, the hospital need not even have a media device 104$_{1-M}$ associated therewith. As discussed above, user 150$_{1-P}$ may have associated media device 104$_{1-M}$ therewith based on registering media device 104$_{1-M}$ through an application 402 (e.g., a mobile application, a web application) executing on a data processing device 108$_{1-R}$ (e.g., a mobile phone, a laptop, a desktop computer) associated with user 150$_{1-P}$ using user e-mail address 212 (in the case of the laptop, the desktop computer) or user phone number 214 (in the case of the mobile phone). Again, as discussed above, following determination of a context, one or more servers 102$_{1-N}$ of interactive computing system 100 may be configured to determine the aforementioned association of media device 104$_{1-M}$ with user 150$_{1-P}$ based on matching of user e-mail address 212 or user phone number 214 registered with the hospital across database 208 (and/or third-party databases 210). Once the matching is done, an identifier 404 (e.g., stored on the one or more server(s); an example identifier 404 may be a PIN) may be provided by the one or more servers 102$_{1-N}$ through application 402. FIG. 4 shows application 402 stored in a memory 454 of data processing device 108$_{1-R}$ configured to execute through a processor 452 thereof.

Additionally, once the matching is done, a notification 406 may be triggered through media device 104$_{1-M}$. User 150$_{1-P}$ may check for notification 406 to render a message 408 associated therewith through media device 104$_{1-M}$. Message 408 may be along the lines of "Dear patron, I hope that you have had a good experience with _____ hospital. You have one survey pending. Would you like to provide a PIN to continue with the survey?" If user 150$_{1-P}$ responds with a "yes," another message 410 along the lines of "Please provide your PIN" may be rendered through media device 104$_{1-M}$. Again, the authentication and loading of queries 112$_{1-T}$ associated with survey 300 may be performed as discussed above. Again, survey 300 may be terminated at any point by user 150$_{1-P}$ and continued at a later time.

In the embodiment discussed with regard to FIG. 4, survey 300 may be conducted through media device 104$_{1-M}$ entirely within the privacy of the residence of user 150$_{1-P}$. It is possible to envision other subjects of survey 300. For example, survey 300 may be about an experience of user 150$_{1-P}$ with respect to a commercial product (e.g., an online course, a perishable good, a computing device) or a place of stay (e.g., a hotel). It is also possible for survey 300 to instead be a means to provide product inputs to an entity via media device 104$_{1-M}$. In this case, user 150$_{1-P}$ may provide the context by conveying intent via data processing device 108$_{1-R}$. For example, user 150$_{1-P}$ may browse a webpage associated with an entity of interest. The entity may track the browsing of user 150$_{1-P}$ through a server 102$_{1-N}$ associated therewith, which then triggers a communication to user 150$_{1-P}$ that provides an identifier 404. User 150$_{1-P}$ may authenticate himself/herself using identifier 404 to be able to provide product inputs through media device 104$_{1-M}$. In another example, user 150$_{1-P}$ may explicitly convey intent by way of directly expressing interest to the entity through an e-mail. All reasonable variations are within the scope of the exemplary embodiments discussed herein.

Figure 5:
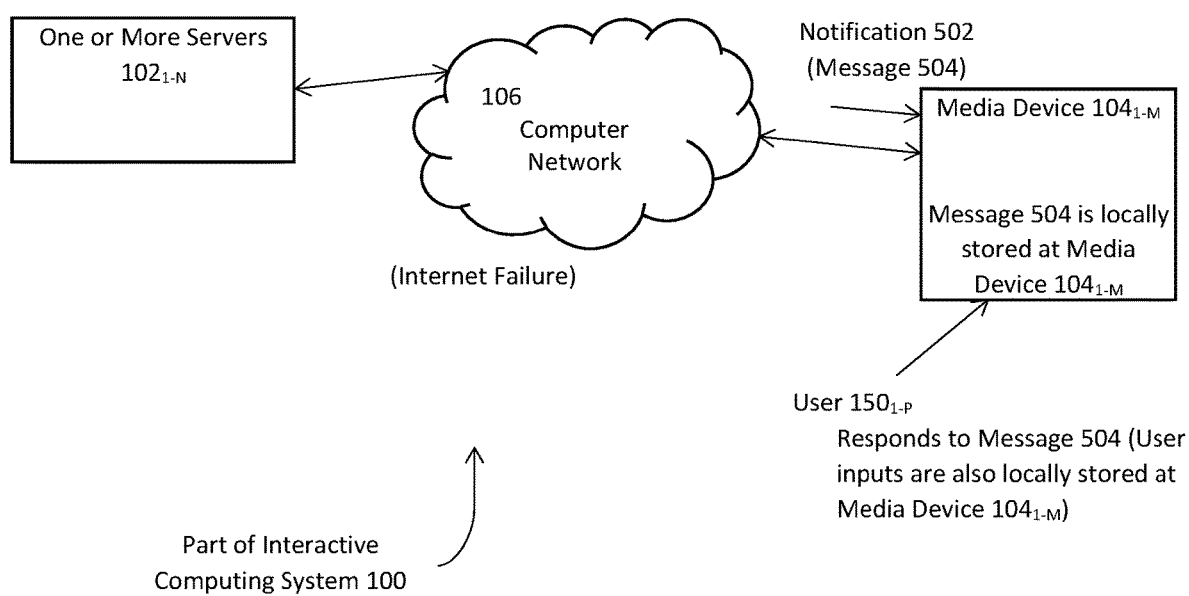
FIG. 5 is a schematic view of an example interaction through the interactive computing system of FIG. 1.

FIG. 5 shows another example interaction through interactive computing system 100, according to one or more embodiments. In one or more embodiments, one or more servers 102$_{1-N}$ of interactive computing system 100 may trigger a notification 502 through media device 104$_{1-M}$. However, media device 104$_{1-M}$ may be in a setting of internet failure or internet unavailability. In this case, a message 504 associated with notification 502 may be in the form of a voice message (e.g., locally stored at media device 104$_{1-M}$). User 150$_{1-P}$ may respond to the voice message and provide inputs (e.g., again, locally stored at media device 104$_{1-M}$). Said inputs may be authenticated and reconciled through the one or more servers 102$_{1-N}$ once internet connectivity is available.

Figure 6:
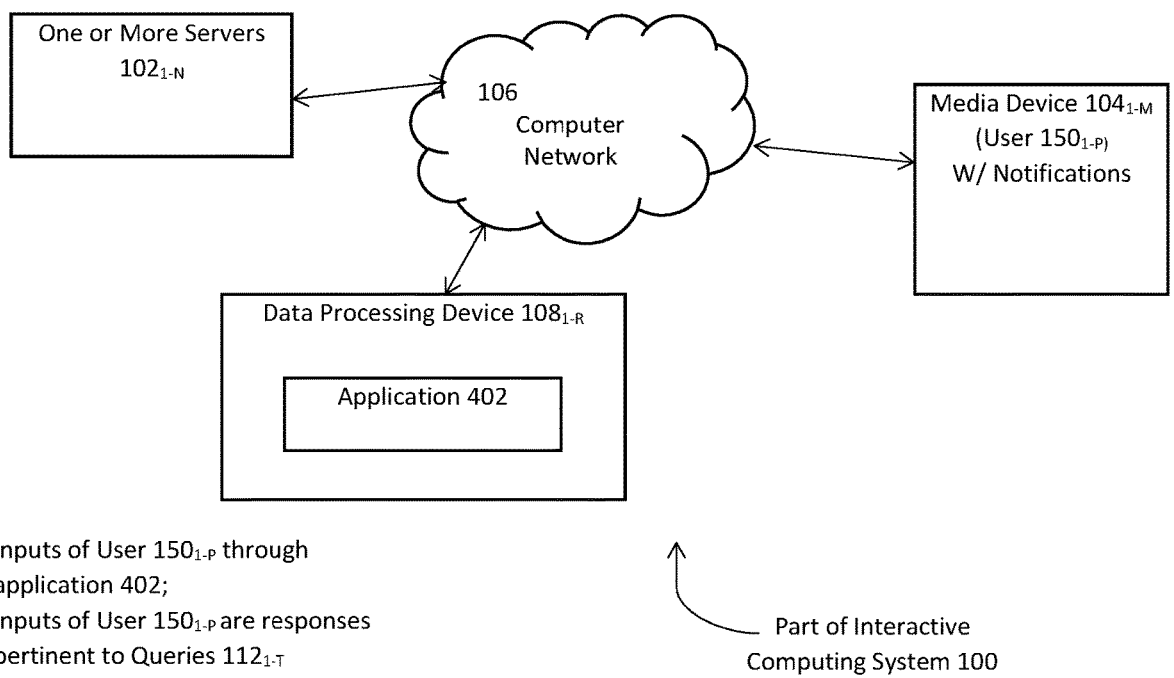
FIG. 6 is a schematic view of a user of the interactive computing system of FIG. 1 providing text inputs to a media device via a data processing device thereof as responses to queries.

In one or more embodiments, as discussed above, media device 104$_{1-M}$ may be a video device, an audio device, a gesture recognition device and/or a touch based device. In the case of a video device, an entity can collate inputs through a more interactive session. The gesture recognition device may recognize emotions of a user 150$_{1-P}$ in addition to a plethora of recognitions including but not limited to hand gestures, head gestures and patterns input through media device 104$_{1-M}$ and/or a data processing device 108$_{1-R}$ associated with user 150$_{1-P}$; the scope of media devices $104_{1-M}$ (audio/video/gestures) may extend to include IoT devices, brain/neuro-imaging devices and touch based devices. While inputs to user $150_{1-P}$ is provided through an audio device, a video device, a gesture recognition device and/or a touch based device in the appropriate audio, video and gesture formats, user $150_{1-P}$ may, in turn, provide inputs to media device $104_{1-M}$ also through data processing device $108_{1-R}$. Thus, text user inputs are within the scope of the exemplary embodiments discussed herein. FIG. 6 shows user $150_{1-P}$ providing text inputs to media device $104_{1-M}$ via data processing device $108_{1-R}$ thereof as responses to queries $112_{1-T}$.

Again, after going through the processes discussed above, user $150_{1-P}$ may find notifications pertinent to interactions with media device $104_{1-M}$. While messages associated with the notifications may be rendered through media device $104_{1-M}$, user $150_{1-P}$ may provide responses to the messages (e.g., associated with survey 300) through data processing device $108_{1-R}$ (e.g., through application 402). It should be noted that the embodiments of FIGS. 1-6 may provide for multiple contextual interactions between users $150_{1-P}$ and media devices $104_{1-M}$ of interactive computing system 100. For example, a user $150_{1-P}$ may have multiple surveys available to respond to through media device $104_{1-M}$ owing to there being multiple contexts thereto (e.g., interaction with multiple entities). Additionally, user $150_{1-P}$ may not be limited to an individual consumer. User $150_{1-P}$ may be a corporate entity represented by a person. All business-to-consumer (B2C), business-to-business (B2B), consumer-to-consumer (C2C) and consumer-to-business (C2B) interactions through media devices $104_{1-M}$ in interactive computing system 100 are within the scope of the exemplary embodiments discussed herein.

Figure 7:
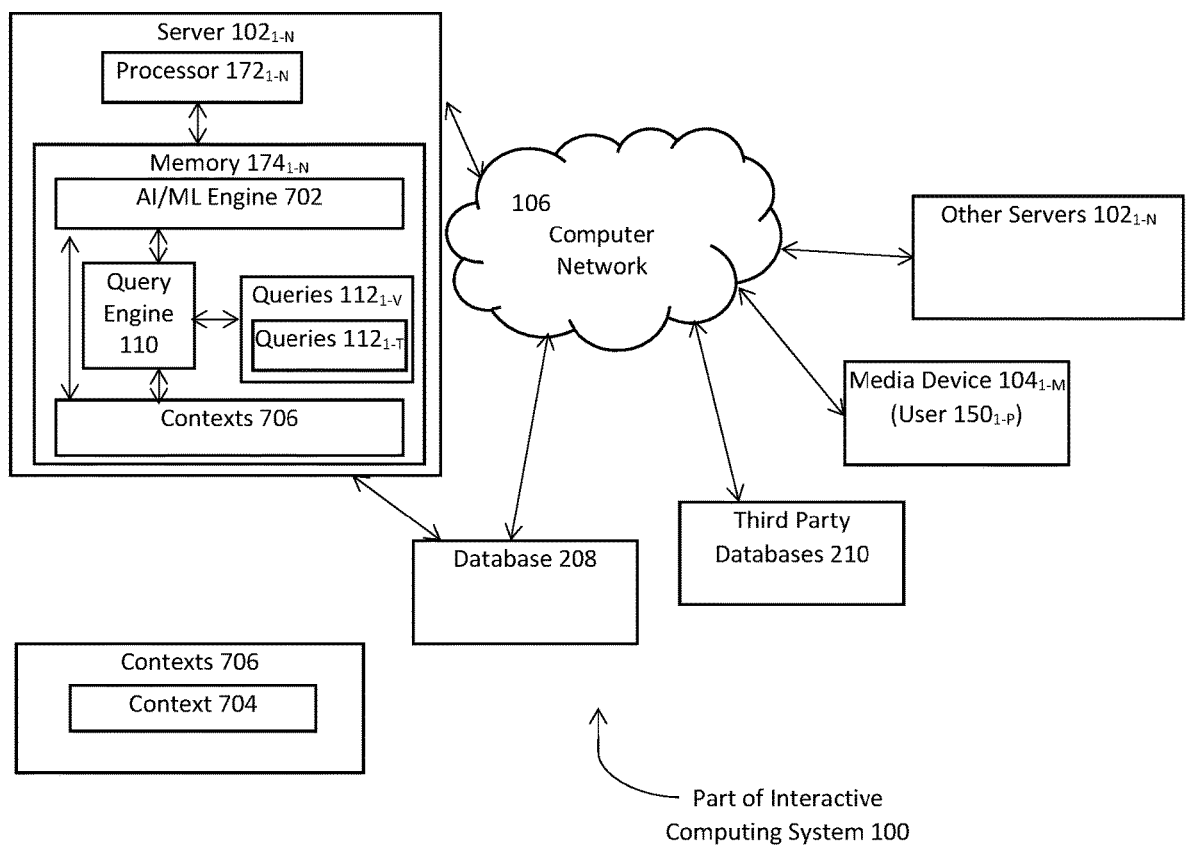
FIG. 7 is a schematic view of an Artificial Intelligence (AI)/Machine Learning (ML) engine executing on a server of the interactive computing system of FIG. 1.

FIG. 7 shows an AI/ML engine 702 executing on a server $102_{1-N}$ of interactive computing system 100, according to one or more embodiments; AI/ML engine 702 is stored in memory $174_{1-N}$ of server $102_{1-N}$ and interfaced with query engine 110. Although FIG. 7 shows AI/ML engine 702 as executing on one server $102_{1-N}$, it should be noted that AI/ML engine 702 may be distributed across servers $102_{1-N}$ of interactive computing system 100. In one or more embodiments, as discussed above, AI/ML engine 702 may be configured to extract queries $112_{1-T}$, refine queries $112_{1-T}$ and build queries $112_{1-T}$ in specific contexts. For the aforementioned purpose, AI/ML engine 702 may leverage an ever-changing database 208 and/or third-party databases 210. In one or more embodiments, queries $112_{1-T}$ available across interactive computing system 100 may be interpreted and patterns identified therein through AI/ML engine 702. For the aforementioned purpose, in one or more embodiments, AI/ML engine 702 may be trained by personnel at one or more servers $102_{1-N}$ and/or data processing devices $108_{1-R}$ associated therewith.

When authentication of user $150_{1-P}$ is done for survey 300, AI/ML engine 702 may be configured to fetch queries $112_{1-T}$ pertinent to a current context 704 determined thereby. For example, AI/ML engine 702 may have identified patterns of queries $112_{1-V}$ to patients (users $150_{1-P}$) similar to the current user $150_{1-P}$ and may initially build and fetch a fixed set of queries $112_{1-T}$. Depending on the response of user $150_{1-P}$ to, say, query $112_1$ through media device $104_{1-M}$, AI/ML engine 702 may dynamically refine query $112_2$ based on matching contexts (e.g., stored as contexts 706 including context 704) across servers $102_{1-N}$ of interactive computing system 100. In one or more embodiments, the adaptive dynamic refinement of queries $112_{1-T}$ based on interaction with user $150_{1-P}$ provides for a more realistic collection of inputs from user $150_{1-P}$. In cases where there are no pre-existing contexts, preset queries $112_{1-T}$ may be loaded (e.g., fetched from a third-party database 210) via media device $104_{1-M}$. User inputs across contexts 706 may be analyzed through AI/ML engine 702 and queries $112_{1-T}$ refined based on algorithms implemented therein.

Figure 8:
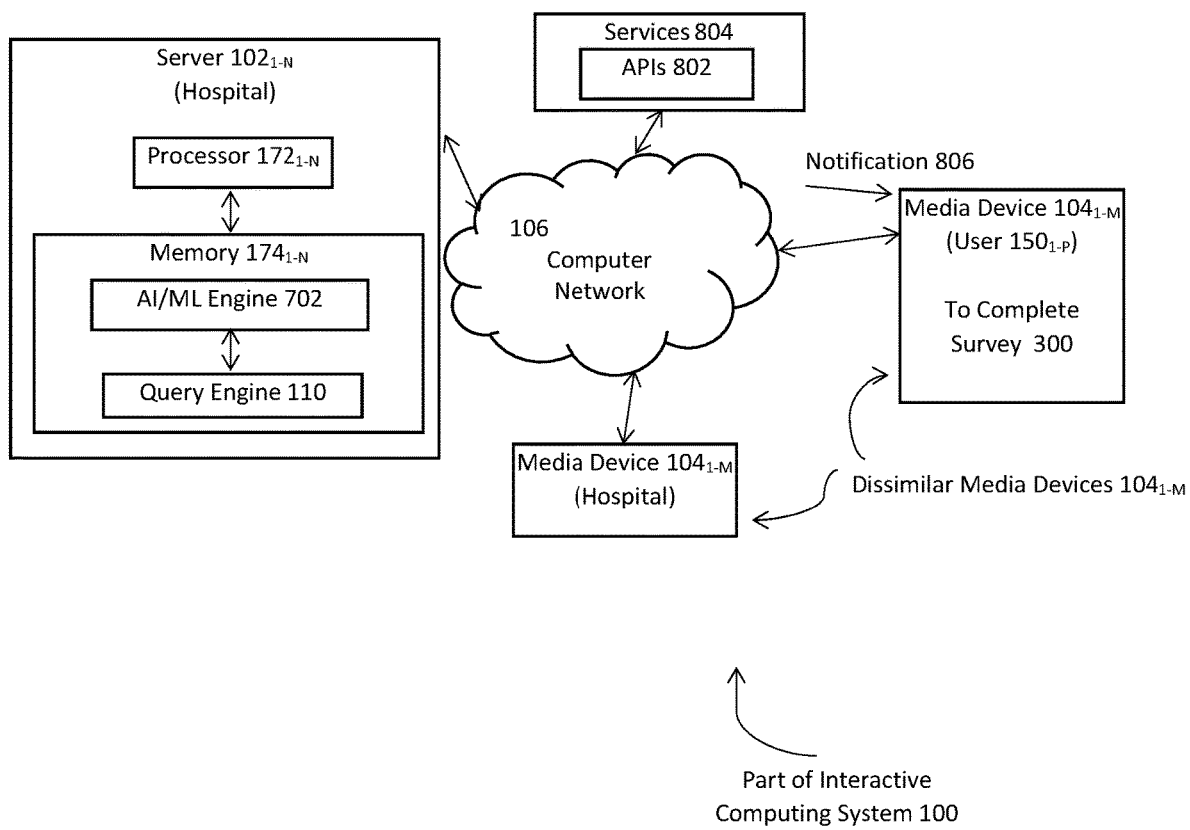
FIG. 8 is a schematic view of a scenario of user interaction with dissimilar media devices in the example context of FIG. 2.

FIG. 8 shows a scenario of interaction with dissimilar media devices $104_{1-M}$ across the hospital and the patient (example user $150_{1-P}$). Now, server $102_{1-N}$ associated with the hospital, in conjunction with one or more other servers $102_{1-N}$, may be configured to leverage APIs 802 exposed through services 804 available to server $102_{1-N}$ to determine association (e.g., via an e-mail address, a phone number) of a user $150_{1-P}$ with a media device $104_{1-M}$ (e.g., a GOOGLE HOME MINI®) dissimilar to media device $104_{1-M}$ (e.g., AMAZON ECHO® smart speaker) of the hospital. In one or more embodiments, a service 804 may enable triggering of a notification 806 on media device $104_{1-M}$ of user $150_{1-P}$. Again, while user $150_{1-P}$ may initiate survey 300 through media device $104_{1-M}$ of the hospital, user $150_{1-P}$ may be able to complete survey 300 through media device $104_{1-M}$ thereof. All reasonable variations are within the scope of the exemplary embodiments discussed herein.

Figure 9:
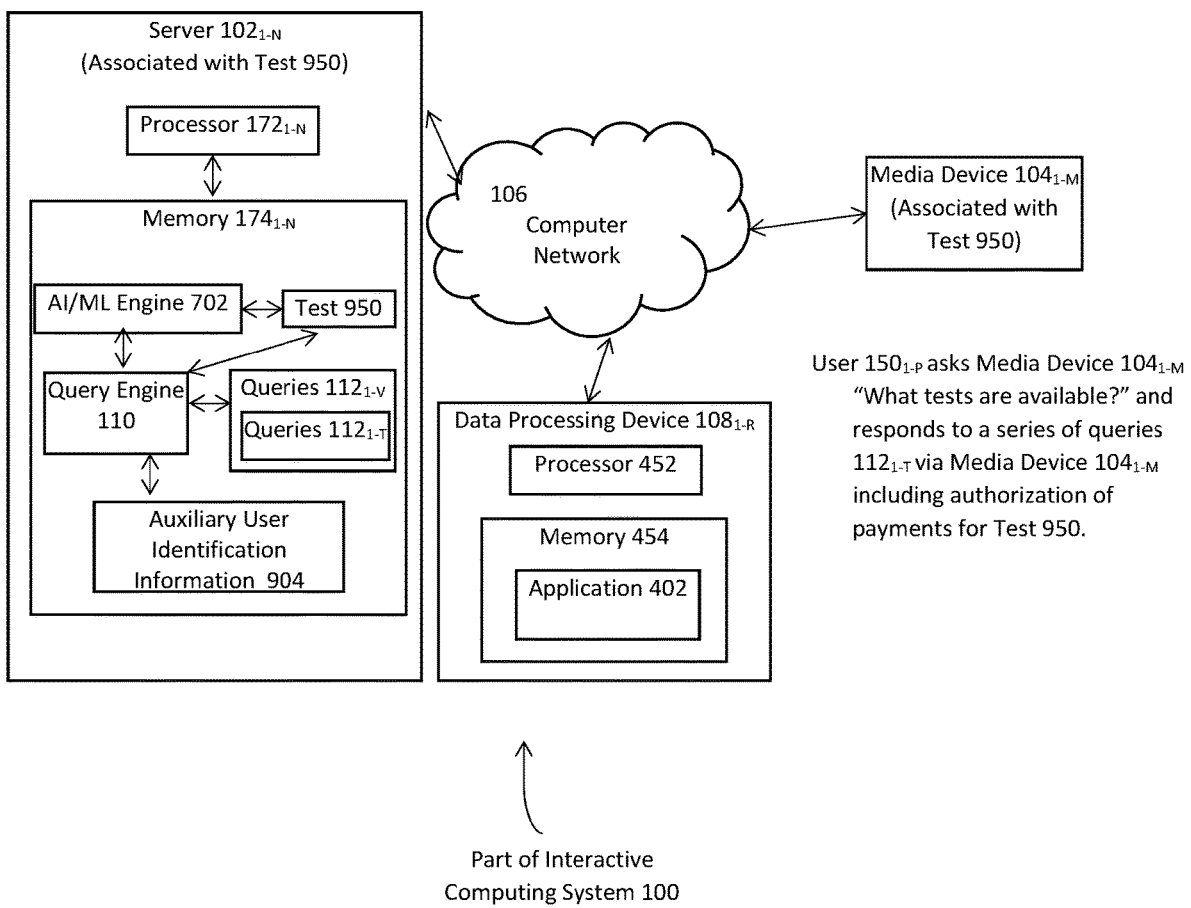
FIG. 9 is a schematic view of another example context of taking a test through a media device of the interactive computing system of FIG. 1.

FIG. 9 shows a context 902 of a user $150_{1-P}$ taking a test 950 through media device $104_{1-M}$. Here, the provision of a PIN discussed above may be substituted with authentication in other ways. For example, user $150_{1-P}$ may have expressed intent in taking test 950 to set context 902 via a data processing device $108_{1-R}$ associated therewith. Here, the entity (e.g., server $102_{1-N}$) associated with test 950 may provide user $150_{1-P}$ with a link to register therewith using, say, credit card details (example of auxiliary user identification information 904 stored in server $102_{1-N}$) thereof. Alternatively, user $150_{1-P}$ may register through application 402. Once user $150_{1-P}$ is registered, user $150_{1-P}$ may initiate communication at a location of the entity by asking "What tests are available?" to which the entity responds with a list including test 950 through media device $104_{1-M}$. User $150_{1-P}$ may choose a specific test (e.g., test 950) and authorize payment therefor through voice commands and finish taking test 950. In case of test 950 being adaptive, AI/ML engine 702 discussed with regard to FIG. 7 may refine queries $112_{1-T}$ associated with test 950.

It should be noted that appropriate conversion engines (e.g., raw formats to audio/text; and audio to raw formats/text) may be available on one or more servers $102_{1-N}$ of interactive computing system 100 to enable queries $112_{1-T}$ to be put forth to user $150_{1-P}$ in audio/video/gesture formats (gesture formats may be useful to hearing and/or voice impaired users $150_{1-P}$). A combination of all capabilities may be provided in a media device $104_{1-M}$ discussed above. It should be noted that most server $102_{1-N}$ operations discussed above may be executed through query engine 110 and/or AI/ML engine 702.

Further, instructions associated with query engine 110 and AI/ML engine 702 may be tangibly embodied on a non-transitory medium (e.g., a Compact Disc (CD), a Digital Video Disc (DVD), a BLU-RAY DISC®, a hard disk/drive), readable through a data processing device (e.g., a server $102_{1-N}$, a data processing device $108_{1-R}$, a media device $104_{1-M}$). All reasonable variations are within the scope of the exemplary embodiments discussed herein.

Figure 10:
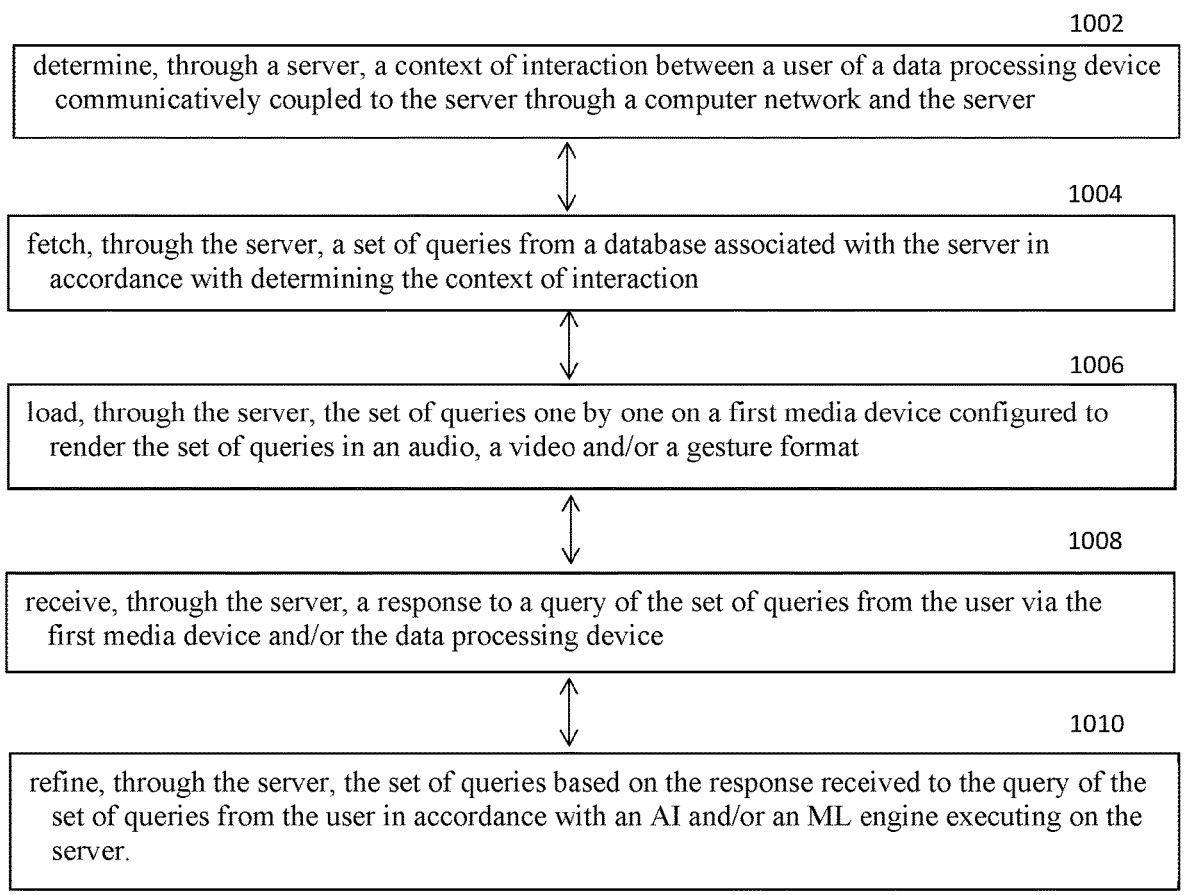
FIG. 10 is a process flow diagram detailing the operations involved in an interactive query based network communication through a media device, according to one or more embodiments.

FIG. 10 shows a process flow diagram detailing the operations involved in an interactive query based network communication through a media device (e.g., media device $104_{1-M}$), according to one or more embodiments. In one or more embodiments, operation 1002 may involve determining, through a server (e.g., server $102_{1-N}$), a context (e.g., context 704, context 902) of interaction between a user (e.g., user $150_{1-P}$) of a data processing device (e.g., data processing device $108_{1-R}$) communicatively coupled to the server through a computer network (e.g., computer network 106) and the server. In one or more embodiments, operation 1004 may involve fetching, through the server, a set of queries (e.g., queries $112_{1-T}$) from a database (e.g., database 208, third-party databases 210) associated with the server in accordance with determining the context of interaction.

In one or more embodiments, operation 1006 may involve loading, through the server, the set of queries one by one on a first media device (e.g., media device $104_{1-M}$) configured to render the set of queries in an audio, a video and/or a gesture format. In one or more embodiments, the first media device may also be communicatively coupled to the server through the computer network. In one or more embodiments, operation 1008 may involve receiving, through the server, a response to a query of the set of queries from the user via the first media device and/or the data processing device. In one or more embodiments, operation 1010 may then involve refining, through the server, the set of queries based on the response received to the query of the set of queries from the user in accordance with an AI and/or an ML engine (e.g., AI/ML engine 702) executing on the server.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., a server $102_{1-N}$, a data processing device $104_{1-M}$). Accordingly, the specification and drawings are to be regarded in an illustrative rather than a restrictive sense.

INCORPORATION BY REFERENCE

All publications, patents, and patent applications cited in this Specification are hereby incorporated by reference in their entirety, including: U.S. Ser. No. 10/149,102 entitled Providing data service options using voice recognition, U.S. Pat. No. 9,781,262 entitled Methods and apparatus for voice-enabling a web application, U.S. Ser. No. 10/503,468 entitled Voice enabling applications, US20190179607 entitled Voice Control of Computing Devices, U.S. Pat. No. 9,959,129 entitled Headless task completion within digital personal assistants, U.S. Pat. No. 9,098,467 entitled Accepting voice commands based on user identity, US2009157483 entitled Method and system for using artificial intelligence to generate or modify an employee prompt or a customer survey, US20160334880 entitled Gesture recognition method, computing device, and control device, US20130159939 entitled Authenticated gesture recognition, U.S. Pat. No. 8,963,836 entitled Method and system for gesture-based human-machine interaction and computer-readable medium thereof

What is claimed is:
1. A method comprising:
   determining a context of interaction between a user and a processing device communicatively coupled to a plurality of servers through a plurality of networks;
   building, through at least one of an Artificial Intelligence (AI) engine and a Machine Learning (ML) engine, a set of queries in an audio, a video, and a gesture format based on the context of interaction;
   fetching, through at least one of the Artificial Intelligence (AI) engine and the Machine Learning (ML) engine, the set of queries in the audio, the video, and the gesture format in accordance with the context of interaction;
   loading the set of queries one by one on a first media device configured to render the set of queries in the audio, the video, and the gesture format, the first media device also communicatively coupled to the plurality of servers through the plurality of networks;
   receiving a response to a query of the set of queries from the user via at least one of: the first media device and the processing device; and
   dynamically building and refining the set of queries in the audio, the video, and the gesture format based on the response received to the set of queries from the user and the context of interaction in accordance with at least one of: the Artificial Intelligence (AI) engine and the Machine Learning (ML) engine;
   wherein loading the set of queries further comprising additionally loading the set of queries from a point of discontinuity of the response on the first media device on to a second media device of a plurality of media devices, the second media device also communicatively coupled to the plurality of servers through the plurality of networks;
   wherein dynamically building and refining the set of queries comprises
      interpreting queries available in third-party databases or across the plurality of servers through the plurality of networks in specific contexts through at least one of the Artificial Intelligence (AI) engine and the Machine Learning (ML) engine,
      identifying patterns of queries to users similar to the user through at least one of the Artificial Intelligence (AI) engine and the Machine Learning (ML) engine, and
      dynamically building and refining the set of queries, based on the identified patterns and one of the specific contexts matching the context of interaction associated with the user;
   wherein each of the plurality of media devices receives responses from the user and stores the responses locally within the respective media device of the plurality of media devices when internet connectivity is unavailable; and
   wherein each of the plurality of media devices reconciles communication with the plurality of servers and communicates the responses to the plurality of servers when the internet connectivity is available.

2. The method of claim 1, comprising the plurality of servers distributed across the plurality of networks.

3. The method of claim 1, further comprising authenticating, through the plurality of servers, the user via the first media device prior to loading the set of queries one by one on the first media device.

4. The method of claim 1, comprising the first media device and the second media device being one of: similar devices and dissimilar devices.

5. The method of claim 1, further comprising:
determining, through the plurality of servers, an identifier of the user; and
determining, through the plurality of servers, an association of the identifier of the user with at least one of: the first media device and the second media device prior to loading the set of queries on the at least one of: the first media device and the second media device.

6. The method of claim 1, further comprising triggering, through the plurality of servers, a notification to the user on the first media device prior to the loading of the set of queries one by one on the first media device.

7. The method of claim 1, wherein the Artificial Intelligence (AI) engine and the Machine Learning (ML) engine is executing on one of the plurality of servers, the first media device, the second media device, and the processing device.

8. A server comprising:
a memory; a storage; and a processor communicatively coupled to the memory, the processor configured to execute instructions to:
determine a context of interaction between a user and a processing device communicatively coupled to a plurality of servers through a plurality of networks;
build, through at least one of an Artificial Intelligence (AI) engine and a Machine Learning (ML) engine, a set of queries in an audio, a video, and a gesture format based on the context of interaction;
fetch, through at least one of the Artificial Intelligence (AI) engine and the Machine Learning (ML) engine, the set of queries in the audio, the video, and the gesture format in accordance with the context of interaction;
load the set of queries one by one on a first media device configured to render the set of queries in the audio, the video and the gesture format, the first media device also communicatively coupled to the plurality of servers through the plurality of networks;
receive a response to a query of the set of queries from the user via at least one of: the first media device and the processing device; and
dynamically build and refine the set of queries in the audio, the video, and the gesture format based on the response received to the set of queries from the user and the context of interaction in accordance with at least one of: the Artificial Intelligence (AI) engine and the Machine Learning (ML) engine;
wherein loading the set of queries further comprising additionally loading the set of queries from a point of discontinuity of the response on the first media device on to a second media device of a plurality of media devices, the second media device also communicatively coupled to the plurality of servers through the plurality of networks;
wherein the plurality of servers comprises a plurality of cloud servers;
wherein dynamically building and refining the set of queries comprises
interpreting queries available in third-party databases or across the plurality of servers through the plurality of networks in specific contexts through at least one of the Artificial Intelligence (AI) engine and the Machine Learning (ML) engine,
identifying patterns of queries to users similar to the user through at least one of the Artificial Intelligence (AI) engine and the Machine Learning (ML) engine, and
dynamically building and refining the set of queries, based on the identified patterns and one of the specific contexts matching the context of interaction associated with the user;
wherein each of the plurality of media devices receives responses from the user and stores the responses locally within the respective media device of the plurality of media devices when internet connectivity is unavailable; and
wherein each of the plurality of media devices reconciles communication with the plurality of servers and communicates the responses to the plurality of servers when the internet connectivity is available.

9. The server of claim 8, being the plurality of servers distributed across the plurality of networks.

10. The server of claim 8, wherein the processor is further configured to execute instructions to authenticate the user via the first media device prior to loading the set of queries one by one on the first media device.

11. The server of claim 8, wherein the processor is further configured to execute instructions to: determine an identifier of the user, and determine an association of the identifier of the user with at least one of: the first media device and the second media device prior to loading the set of queries on the at least one of: the first media device and the second media device.

12. The server of claim 8, wherein the processor is further configured to execute instructions to trigger a notification to the user on the first media device prior to the loading of the set of queries one by one on the first media device.

13. A system comprising:
a plurality of servers; a plurality of networks; a data processing device communicatively coupled to the plurality of servers through the plurality of networks; and a plurality of media devices also communicatively coupled to the plurality of servers through the plurality of networks, wherein a server of the plurality of servers comprising a memory, a storage, and a processor communicatively coupled to the memory, the processor is configured to:
determine a context of interaction between a user and a processing device communicatively coupled to the plurality of servers through a plurality of networks;
build, through at least one of an Artificial Intelligence (AI) engine and a Machine Learning (ML) engine, a set of queries in an audio, a video, and a gesture format based on the context of interaction;
fetch, through at least one of the Artificial Intelligence (AI) engine and the Machine Learning (ML) engine, the set of queries in the audio, the video, and the gesture format in accordance with the context of interaction;
load the set of queries one by one on a first media device configured to render the set of queries in the audio, the video and the gesture format, the first media device also communicatively coupled to the plurality of servers through the plurality of networks;
receive a response to a query of the set of queries from the user via at least one of: the first media device and the processing device; and
dynamically build and refine the set of queries in the audio, the video, and the gesture format based on the response received to the set of queries from the user and the context of interaction in accordance with at least one of: the Artificial Intelligence (AI) engine and the Machine Learning (ML) engine;
wherein loading the set of queries further comprising additionally loading the set of queries from a point of discontinuity of the response on the first media device on to a second media device of a plurality of media devices, the second media device also communicatively coupled to the plurality of servers through the plurality of networks;
wherein the plurality of servers comprises a plurality of cloud servers;
wherein dynamically building and refining the set of queries comprises
interpreting queries available in third-party databases or across the plurality of servers through the plurality of networks in specific contexts through at least one of the Artificial Intelligence (AI) engine and the Machine Learning (ML) engine,
identifying patterns of queries to users similar to the user through at least one of the Artificial Intelligence (AI) engine and the Machine Learning (ML) engine, and
dynamically building and refining the set of queries, based on the identified patterns and one of the specific contexts matching the context of interaction associated with the user;
wherein each of the plurality of media devices receives responses from the user and stores the responses locally within the respective media device of the plurality of media devices when internet connectivity is unavailable; and
wherein each of the plurality of media devices reconciles communication with the plurality of servers and communicates the responses to the plurality of servers when the internet connectivity is available.

14. The system of claim 13, wherein the plurality of servers is distributed across the plurality of networks.

15. The system of claim 13, wherein the processor is further configured to authenticate the user via the first media device prior to loading the set of queries one by one on the first media device.

16. The system of claim 13, wherein the first media device and the second media device are one of: similar devices and dissimilar devices.

17. The system of claim 13, wherein the processor is further configured to: determine an identifier of the user, and determine an association of the identifier of the user with at least one of: the first media device and the second media device prior to loading the set of queries on the at least one of: the first media device and the second media device.

18. The system of claim 13, wherein the processor is further configured to trigger a notification to the user on the first media device prior to the loading of the set of queries one by one on the first media device.

19. The system of claim 13, wherein the plurality of media devices comprises the first media device, the second media device, a third media device, a fourth media device, and up to nth media device.

* * * * *